May 21, 1963

P. ANGENIEUX 3,090,282

MECHANISM FOR CONTROLLING THE AXIAL
DISPLACEMENTS OF OPTICAL ELEMENTS

Filed March 3, 1959

Inventor:
Pierre Angenieux
By Ernest ...
Attorney

May 21, 1963

P. ANGENIEUX 3,090,282

MECHANISM FOR CONTROLLING THE AXIAL
DISPLACEMENTS OF OPTICAL ELEMENTS

Filed March 3, 1959

Inventor:
Pierre Angenieux
By Ernest Chastorque
Attorney

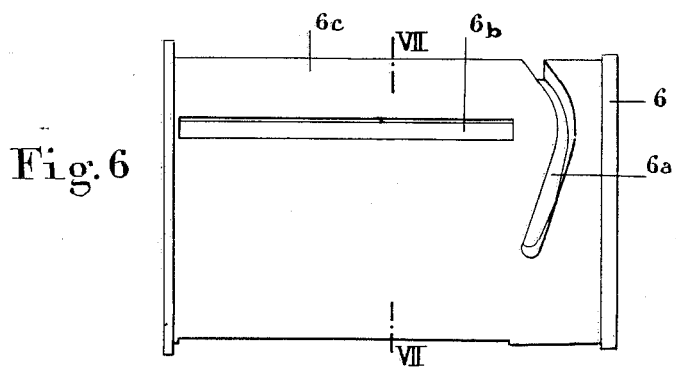
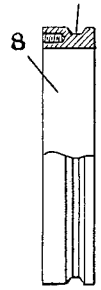
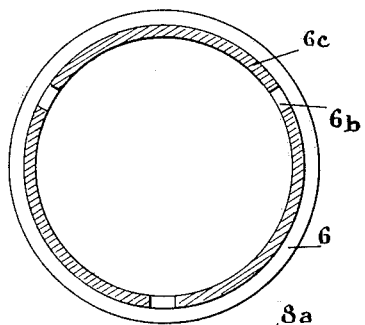
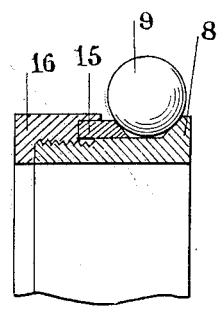
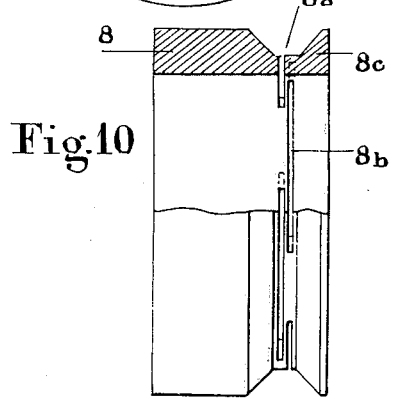
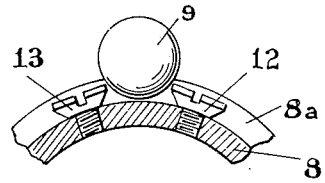
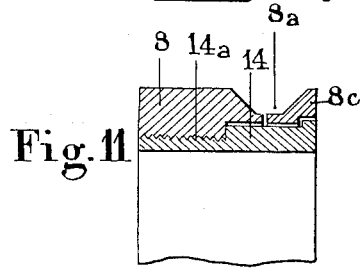

United States Patent Office 3,090,282
Patented May 21, 1963

3,090,282
MECHANISM FOR CONTROLLING THE AXIAL DISPLACEMENTS OF OPTICAL ELEMENTS
Pierre Angenieux, 27 Rue du Cherche Midi, Paris, France
Filed Mar. 3, 1959, Ser. No. 796,791
Claims priority, application France Jan. 28, 1959
5 Claims. (Cl. 88—57)

The present invention relates in general to the mounting of optical elements and has specific reference to a mechanism for controlling the axial displacements of optical elements in a fixed tube according to a predetermined law.

A device of this character is applicable chiefly to variable focal length lenses. As a matter of fact, it is known that lenses of this type comprise as a rule, in addition to fixed optical elements, a pair of movable optical elements adapted to be displaced in their axial direction in relation to the fixed elements according to a law permitting the formation of an image of variable magnification but fixed position. The chief difficulty to be overcome when embodying a device of this character rests in the magnitude of the friction developing between the different mechanical parts during their relative movements. If the operator acts directly upon a control member, the reduction of the friction and therefore of the effort necessary for actuating this mechanism is beneficial, but the advantage of this reduction is increased considerably in case the same control member is driven from a motor of relatively moderate power rating.

It is one object of the present invention to provide a mechanism for controlling the axial displacements of optical elements in a fixed tube wherein the magnitude of the relative frictional engagement in such mechanism is reduced to a minimum by the use of balls.

With this and other objects in view which will become apparent in the following detailed description, the present invention will be clearly understood in connection with the accompanying drawings, in which:

FIG. 6 is a side elevational view of another component element of the mechanism, which is called "first barrel" in the following description;

FIG. 7 is a cross-section taken along the lines 7—7 of FIG. 6;

FIG. 8 is a part-sectional, part-elevational view of a further component element of the mechanism designated by the terms "second barrel" in following description; and FIGS. 9, 10, 11 and 12 illustrate details in sections of different embodiments of said "second barrel."

Figure 1:
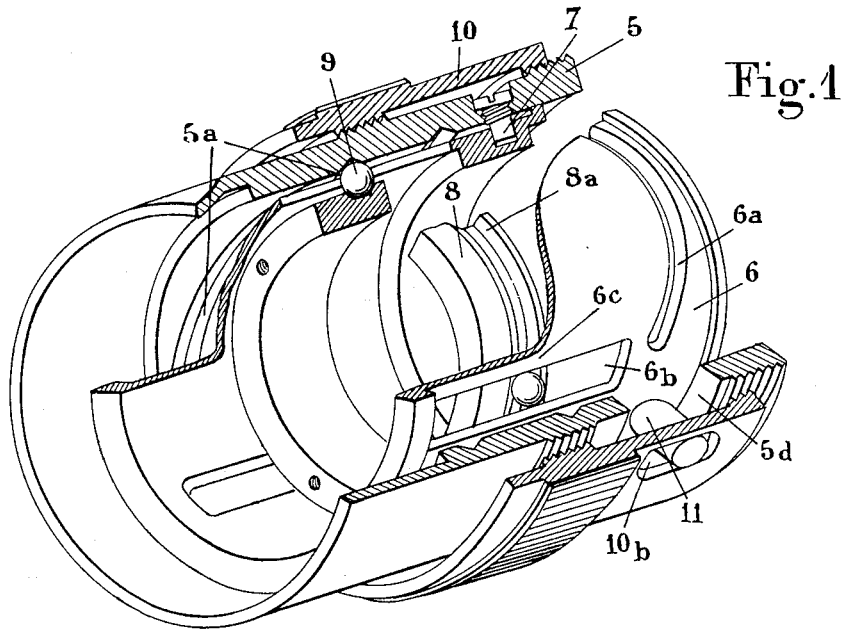
FIGURE 1 is an isometric view, having portions broken away, which illustrates the complete mechanism according to a first embodiment of the present invention.
Figure 2:
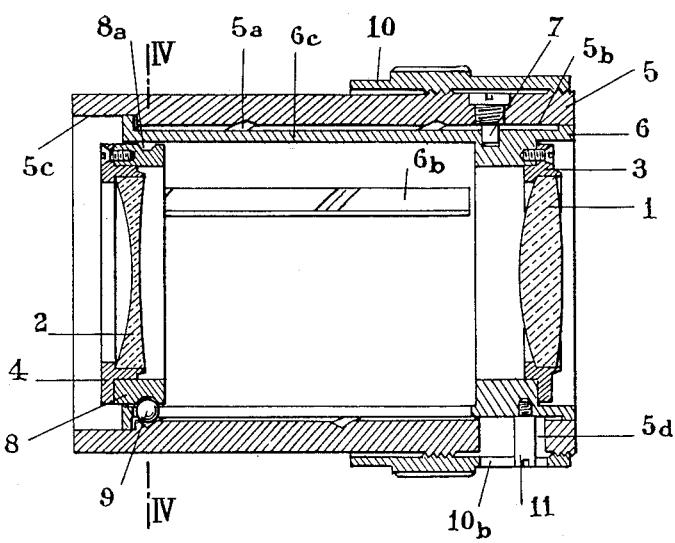
FIGS. 2 and 3 are axial sections of the same mechanism, wherein two lenses representing two movable optical elements are added with respect to FIG. 1, these figures differing from each other only by the positions of lenses and correspond to the extreme positions thereof.
Figure 3:
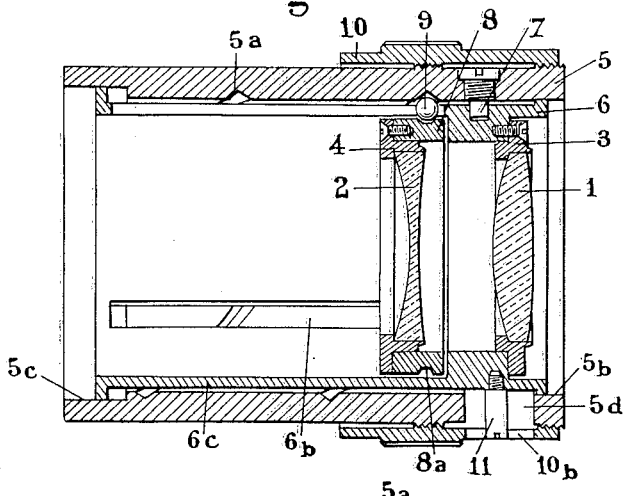
Figure 4:
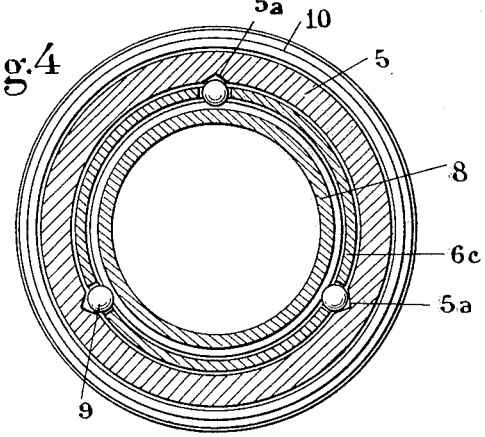
FIG. 4 is a cross-section taken along the lines 4—4 of FIG. 2.
Figure 5:
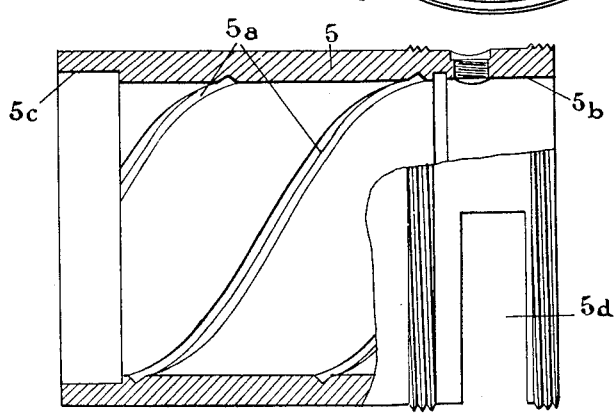
FIG. 5 is an axial section of the mechanism, a part of which being broken away to show one portion of its outer periphery, this part of the mechanism constituting in the following description the fixed supporting tube.

Referring now to the drawings, and in particular to FIGS. 2 and 3, the lenses 1, 2 are two movable optical elements set in rings 3, 4 respectively; these elements are not shown in the other figures.

In FIGS. 1, 2, 3 and 4, illustrating the complete mechanism the latter is shown as comprising a fixed supporting tube 5 having fitted and centered therein a first barrel 6 rigid with the aforesaid ring 3 and therefore with the optical element 1, said first barrel being adapted to rotate and slide longitudinally in relation to the fixed supporting tube 5.

The first barrel 6 has a cam-groove 6a (FIGS. 1 and 6) formed therein and engaged by a pin 7 solid with the fixed supporting tube 5. The cam-groove 6a is so designed that any rotational movement performed by the first barrel 6 produces the desired axial displacement of the lens 1 which is mounted in said first barrel 6.

A second barrel 8, having the lens 2 rigidly mounted therein, which is carried by the ring 4, is formed with a circular groove 8a constituting a first ball race engaged by three balls 9.

The fixed supporting tube 5 has formed on its inner wall three helical grooves 5a of identical pitch which are engaged by the aforesaid three balls 9. These three helical grooves 5a are equally spaced from one another in order to center accurately the assembly comprising the fixed supporting tube 5 and the second barrel 8 with the balls 9 interposed therebetween.

In the example described and illustrated herein the three grooves 5a have the same configuration, but the latter is immaterial as far as the scope of the present invention is concerned. These grooves 5a are so designed that to any movement of rotation imparted to the balls 9 about the axis of the fixed supporting tube 5, there corresponds the desired axial displacement of the second barrel 8 and therefore, of the lens 2 carried by the latter. There are three helical grooves 5a in the disclosed embodiment and this is the minimum number of helical grooves required for centering the second barrel 8, but anybody skilled in the art will be readily aware of the fact, that a greater number of grooves 5a may be used without departing from the spirit and scope of the invention.

The first barrel 6 having one end thereof fitted and centered in a bore 5b of the fixed supporting tube 5, comprises an integral tubular extension 6c having its opposite end fitted and centered in another bore 5c of the fixed supporting tube 5, as shown. The intermediate portion of tube 6c lies, with a sufficient clearance both in and outside, between the fixed supporting tube 5 and the second barrel 8, and has formed therein three longitudinal slots such as 6b engaged by the balls 9, as shown.

Under these conditions, any rotational movement imparted to the first barrel 6, on the one hand, produces through the medium of the pin 7 and cam-groove 6a an axial displacement of said first barrel and, therefore, of the optical element 1 carried thereby, and, on the other hand, carries along the balls 9 retained in the longitudinal slots 6b of the tubular extension 6c. As these balls 9 are held in engagement with the helical grooves 5a, they cause the axial movement of the second barrel 8 and, therefore, of the lens 2 carried by the barrel 8. It is worth pointing out that the use of the first barrel 6 formed with a tubular extension 6c, the assembly constituting a unitary part fitted and centered at either end within the fixed supporting tube 5, ensures the mechanical centering of the first barrel 6 under the most satisfactory conditions and facilitates considerably the movements of the barrel 6 in the fixed supporting tube 5.

However, it is evident that without departing from the principle of the present invention, it is possible to dispense with the tube 6c and substitute therefore, for example, slotted tongues fitting around some or all of the balls 9.

According to the principle of the present invention, the balls and the first barrel are made for joint rotation with each other, without interfering, however, with their free axial movements; this result can be obtained by using many different and well known procedures.

The rotational movement of the first barrel 6 is controlled from the outside by means of an adequate ring 10 adapted to rotate about the fixed supporting tube 5, the latter and the ring 10 being assembled by threads of a pitch small enough to keep the longitudinal displacements of the ring 10 within reasonable limits. A pin 11 carried by the first barrel 6 and extending freely through an aperture 5d formed in the supporting tube 5 engages a longitudinal slot 10b formed in the ring 10, so that the latter rotates bodily with the first barrel 6.

FIGS. 9, 10, 11 and 12 of the drawings illustrate a modified or alternate embodiment of the second barrel. In FIG. 9, two screws 12, 13, provided in the circular groove 8a of the second barrel 8', have their heads so positioned as to hold the ball 9' against movement relative to the second barrel 8'. This solution is quite advantageous if, for any reason, it is desired to avoid the rolling and to maintain a constant rotational connection between the second barrel 8' and the first barrel 6.

FIG. 10 illustrates the second barrel $8^2$ with six transverse slits 8b formed in the bottom of the groove 8a with a view to impart a certain resiliency to one of the groove sides. Thus, any play likely to develop in the device consisting of the second barrel $8^2$, balls 9 and supporting tube 5 is eliminated.

However, practical tests carried out by the applicant proved that certain shocks might produce a permanent deformation since the elastic limit could be overstepped. Nevertheless it is possible to avoid this drawback, as shown in FIG. 11, by limiting the permissible amplitude of the movement of the inner groove side 8c, for example by providing a retaining ring 14 internally fast with the second barrel $8^3$ by means of screw threads 14a.

Finally, the modified embodiment illustrated in FIG. 12 shows a device, wherein the resiliency of one of the sides of the groove 8a in the second barrel $8^4$ is obtained by interposing a ring 15 of a very resilient material, such as rubber or an adequate plastic material, the ring 15 being held in position by another ring 16 screwed or otherwise fastened on the second barrel 8.

Besides, it is evident that the two sides of the groove 8a could be made of high-resiliency material, the second barrel 8 as illustrated in FIG. 8 being made for example of this material.

Of course, the mechanism described hereinabove and shown in the attached drawings should not be construed as limiting the present invention as it constitutes but a mere example with a view to illustrate in concrete form the character of the present invention, but it will be readily understood by anybody skilled in the are that certain features of the present invention may be used separately or in combination, and that notably, the present invention is applicable to the control of a single optical element mounted in a barrel. In this case, the barrel 6 with its tubular extension 6c, but without any optical element such as the lens 1, does not require any guide means such as the pin 7 and the cam-groove 6a. Its only function would consist in this case in carrying along the balls for rotation and to this end it may be held against longitudinal motion by any suitable mechanical means. It also goes without saying that the same tube 6, 6c could drive simultaneously two or more barrels of the same character as the barrel 8, according to different laws. Thus it would be only necessary to provide other suitably shaped cam-grooves inside the tube 5, the only requirement in this case being to avoid any interference between cam-grooves having different functions.

What I claim as new is:

1. A mechanism for simultaneously controlling the axial displacement of two optical elements according to a specific law for each of said optical elements, said mechanism comprising a fixed tubular support; a first barrel supporting of said optical elements, the latter mounted for concentric rotation within said fixed tubular support, said fixed tubular support having guide means disposed on its inner surface, said first barrel being operatively connected to said fixed tubular through said guide means, the latter comprising cam grooves, so that upon rotation of said first barrel, the latter performs an axial displacement movement of predetermined axial length, a second barrel supporting the other of said optical elements and having a circular groove disposed on its outer peripheral surface, said cam grooves disposed on the inner surface of said fixed tubular support having a predetermined contour dictated by the law governing the axial displacements of said second barrel in relation to the rotary movement of said first barrel; a rotary member secured to said first barrel disposed within said fixed tubular support and surrounding said second barrel; said member having longitudinal slots, a plurality of balls equal in number to that of said cam grooves disposed in said fixed tubular support and engaging the longitudinal slots in said rotary member, each of said balls being disposed in one of said longitudinal slots and engaging on the other hand simultaneously said circular groove of said second barrel, constituting a first guideway, and one of said cam grooves of said fixed tubular support constituting a second guideway, whereby said second barrel is centered by said balls in said fixed tubular support; and means for rotatably driving said first barrel, which, is thereby rotating said balls, and the latter moving in engagement with said cam grooves of said fixed tubular support through said longitudinal slots, in order to ensure the axial displacement of said second barrel according to the desired predetermined law consistent with the configuration of said cam grooves.

2. The control mechanism, as set forth in claim 1, wherein at least one of the lateral edges of said circular grooves of said second barrel is of resilient material, in order to yield and to exert pressure on said balls engaging said circular groove.

3. The control mechanism, as set forth in claim 2, wherein the bottom of said circular groove of said second barrel has a plurality of imbricated slots whereby one of the edges of said circular groove yields resiliently.

4. Control mechanism as set forth in claim 1, wherein said rotary-tube and first barrel assembly is centered and fitted at its end in corresponding bores of said fixed supporting tube.

5. Control mechanism as set forth in claim 1, wherein at least one ball is held against movement in the groove of the other barrel by means of stops secured therein, thereby providing a constant rotary connection between said other barrel and said first barrel.

References Cited in the file of this patent

UNITED STATES PATENTS

| | | |
|---|---|---|
| 751,116 | Stark | Feb. 2, 1904 |
| 1,321,906 | Gehrmann | Nov. 18, 1919 |
| 1,649,646 | Badgley | Nov. 15, 1927 |
| 1,898,905 | Seitz | Feb. 21, 1933 |
| 2,179,850 | Glancy | Nov. 14, 1939 |
| 2,362,603 | Wittel | Nov. 14, 1944 |
| 2,737,082 | Dowling | Mar. 6, 1956 |
| 2,873,646 | Angenieux | Feb. 17, 1959 |
| 2,959,101 | Sandback et al. | Nov. 8, 1960 |

FOREIGN PATENTS

| | | |
|---|---|---|
| 1,167,796 | France | Aug. 18, 1958 |